(12) United States Patent
Scott et al.

(10) Patent No.: US 12,715,146 B2
(45) Date of Patent: Aug. 25, 2026

(54) LOGISTICS ROBOTIC SYSTEM WITH GRASPING END EFFECTOR

(71) Applicant: Intelligrated Headquarters, LLC, Mason, OH (US)

(72) Inventors: Darius Scott, Baltimore, MD (US); David Thomas Gorthy, Reisterstown, MD (US); Eamon Kelly, Baltimore, MD (US)

(73) Assignee: Intelligrated Headquarters, LLC, Mason, OH (US)

( * ) Notice: Subject to any disclaimer, the term of this patent is extended or adjusted under 35 U.S.C. 154(b) by 939 days.

(21) Appl. No.: 18/052,170

(22) Filed: Nov. 2, 2022

(65) Prior Publication Data

US 2024/0139970 A1 May 2, 2024

(51) Int. Cl.
*B25J 15/02* (2006.01)
*B25J 19/02* (2006.01)

(52) U.S. Cl.
CPC ........... *B25J 15/0253* (2013.01); *B25J 19/02* (2013.01)

(58) Field of Classification Search
CPC ......... B25J 15/0253; B25J 19/02; B66C 1/14; B66C 1/34; B66C 1/48; B66C 1/425
USPC ............................................... 294/207, 119.1
See application file for complete search history.

(56) References Cited

U.S. PATENT DOCUMENTS 4,750,132 A * 6/1988 Pessina .................. B65G 61/00 212/319
5,588,796 A * 12/1996 Ricco ..................... B25J 9/1679 414/753.1
5,727,832 A * 3/1998 Holter .................. B25J 15/0616 294/185

(Continued)

FOREIGN PATENT DOCUMENTS

CN 206615765 U 11/2017
CN 208008024 U 10/2018

(Continued)

OTHER PUBLICATIONS

Extended European Search Report Mailed on Mar. 26, 2024 for EP Application No. 23199441, 6 page(s).

(Continued)

*Primary Examiner* — Paul T Chin
(74) *Attorney, Agent, or Firm* — Alston & Bird LLP

(57) ABSTRACT

An end effector for operating logistic robotic systems. The end effector comprises a frame assembly and a gripping mechanism. The gripping mechanism grasps the object using one or more grasping element. The grasping element is configurable between an open configuration and an activated configuration. The gripping mechanism is independently moveable relative to the frame assembly in one or more directions. The end effector is configured to engage the object such that the frame assembly contacts a first portion of the object, and the gripping mechanism contacts a second portion of the object. The frame assembly comprises a first frame element and a second frame element configured for (Continued)

movement relative to the first frame element based on a contact of the second frame element with the first portion of the object. The end effector can be used in robotic picking systems to handle packages and similar items.

20 Claims, 9 Drawing Sheets

(56) References Cited

U.S. PATENT DOCUMENTS 6,082,797 A * 7/2000 Antonette .............. B25J 15/026 294/103.1
6,309,001 B1 * 10/2001 Sherwin ................... A21C 9/08 294/100
6,806,531 B1 * 10/2004 Chen ...................... H10B 41/30 257/317
8,556,318 B2 * 10/2013 Wu ................... H01L 21/68707 414/941
8,622,684 B2 * 1/2014 Bao ........................ B65G 47/88 414/781
8,628,131 B2 * 1/2014 Lang .................... B25J 11/0045 294/197
9,575,787 B2 * 2/2017 Tsirkin ................ G06F 9/45558
10,836,525 B1 11/2020 Alspaugh
11,305,436 B2 * 4/2022 Tao ...................... B25J 15/0253
2007/0280812 A1 12/2007 Morency et al.
2009/0317221 A1 * 12/2009 Hawes ................. B25J 15/0253 414/814
2020/0346792 A1 11/2020 Curhan et al.
2025/0135661 A1 * 5/2025 Ochiishi .............. B25J 15/0033

FOREIGN PATENT DOCUMENTS

CN 111846919 A 10/2020
DE 102013003768 A1 8/2014
EP 3868523 A1 8/2021
WO 2021/053323 A1 3/2021

OTHER PUBLICATIONS

CN Office Action, including Search Report Mailed on Mar. 11, 2026 for CN Application No. 202311314008, 7 page (s).
English Translation of CN Office Action dated Mar. 11, 2026 for CN Application No. 202311314008, 8 page(s).

* cited by examiner 100
130
110
122B
122
120
123
121B
121

130
122B
120
122
121
110
121B 10
130
100
220
210
211
122
121
120
200

10
130
100
220
210
211
122
121
200
120

LOGISTICS ROBOTIC SYSTEM WITH GRASPING END EFFECTOR

FIELD OF INVENTION

Example embodiments of the present invention relate generally to a materials handling system configured for load and unloading objects, and more specifically, to an end effector configured with a grasping mechanism configured to engage with objects.

BACKGROUND

The present disclosure relates in general to a robotic system for handling objects and is more particularly directed to an end effector configured to apply equal amounts of tension to a plurality of objects regardless of the variability of the object. A handling environment load with a plurality of objects are transported to deliver objects to a loading and unload area. End effectors operably connected to a robotic system have been used for loading and unloading objects. However, these alternative end effectors are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for operating logistic robotic systems. In various embodiments, an end effector configured to selectively engage an object may comprise a frame assembly; and a gripping mechanism configured to grasp the object using one or more grasping element, the one or more grasping element being configurable between an open configuration and an activated configuration; wherein the gripping mechanism is independently moveable relative to the frame assembly in one or more directions; and wherein the end effector is configured to engage the object such that the frame assembly contacts a first portion of the object, and the gripping mechanism contacts a second portion of the object.

In various embodiments, the frame assembly may comprise a first frame element configured for movement with a positioning mechanism operatively coupled to the end effector; and a second frame element configured to contact the first portion of the object, the second frame element being operatively coupled to the first frame element and configured for movement relative to the first frame element based at least in part on a contact of the second frame element with the first portion of the object. In certain embodiments, the first frame element may define an at least substantially rigid configuration relative to the positioning mechanism, and wherein the second frame element is configured for movement relative to the first frame element along a longitudinal axis based on at least one force acting on the second frame assembly in an at least partially longitudinal direction.

In various embodiments, the one or more grasping elements may comprise a first grasping arm and a second grasping arm, the first grasping arm and the second grasping being configured to define a lateral gap therebetween. In certain embodiments, the first grasping arm and the second grasping arm may be laterally moveable relative to one another such that the lateral gap is defined by a gap width that is adjustable, the adjustable gap width being configured to vary as the gripping mechanism is selectively configured between the open configuration and the activated configuration. In certain embodiments, the activated configuration of the gripping mechanism may be defined by one or more of the first grasping arm and the second grasping arm being moved so as to minimize the adjustable gap width of the lateral gap therebetween in order to secure the second portion of the object between the first grasping arm and the second grasping arm. In various embodiments, the gripping mechanism may be independently moveable relative to the frame assembly along a longitudinal axis. In certain embodiments, the one or more grasping elements may be configurable between the open configuration and the activated configuration based on one or more movements along a lateral axis. In various embodiments, the longitudinal axis may be at least substantially perpendicular to the lateral axis.

In various embodiments, the end effector may be configured for selectively reconfiguring at least a portion of the object engaged therewith between a nominal configuration and a tightened configuration. In certain embodiments, the end effector may be configured for selectively reconfiguring the at least a portion of the object engaged therewith between the nominal configuration and the tightened configuration based on an independent movement of the gripping mechanism relative to the frame assembly that causes a longitudinal distance defined between the first portion of the object engaged with the frame assembly and the second portion of the object engaged with the gripping mechanism to increase. In certain embodiments, the end effector may be configured to selectively reconfigure the at least a portion of the object to the tightened configuration upon the one or more grasping elements being provided in the activated configuration. In certain embodiments, the end effector may be configured to selectively reconfigure the at least a portion of the object to the tightened configuration further upon the frame assembly being engaged with the first portion of the object.

In various embodiments, the end effector may be configured to selectively move the frame assembly and the gripping mechanism at least substantially simultaneously along a longitudinal axis to facilitate one or more of an engagement with at least a portion of the object and a repositioning of the object from first longitudinal position to a second longitudinal position; and wherein the end effector is further configured to selectively move the gripping mechanism independently along the longitudinal axis relative to the frame assembly to facilitate a reconfiguration of the object from a nominal configuration to a tightened configuration. In various embodiments, the end effector may further comprise one or more sensors configured to measure data corresponding at least in part to a position of the frame assembly relative to one or more of the object and the gripping mechanism. In certain embodiments, at least a portion of the one or more sensors may be configured to detect an engagement of the frame assembly with the object. In certain embodiments, at least a portion of the one or more sensors may be configured to determine a relative position of the gripping mechanism with respect to at least a portion of the frame assembly, the relative position being defined along a longitudinal axis. Further, in certain embodiments, at least a portion of the one or more sensors may be configured to determine a relative position of the gripping mechanism with respect to the at least a portion of the frame assembly based on one or more detected forces corresponding to an arrangement of a first frame element of the frame assembly relative to a second frame element of the frame assembly, wherein the frame assembly is configured for contacting the second portion of the object at the second frame element.

Further, in certain embodiments, at least a portion of the one or more sensors may be configured to sense position data defined by one or more of a first frame element of the frame assembly and a second frame element of the frame assembly, wherein the frame assembly is configured for contacting the second portion of the object at the second frame element, wherein the frame assembly comprises one or more spring elements operatively coupled to both the first frame element and the second frame element such that a reposition of the first frame element relative to the second frame element is at least partially affected by a spring force defined by the one or more spring elements, and wherein the end effector is configured such that the spring force varies based on a relative position of the second frame element with respect to one or more of the first frame assembly and the gripping mechanism as defined along a longitudinal axis.

Various embodiments are directed to a system for handling an object within a handling environment, the system comprising an end effector configured to selectively engage the object, the end effector comprising: a frame assembly; and a gripping mechanism configured to grasp the object using one or more grasping element, the one or more grasping element being configurable between an open configuration and an activated configuration; wherein the gripping mechanism is independently moveable relative to the frame assembly in one or more directions; and wherein the end effector is configured to engage the object such that the frame assembly contacts a first portion of the object, and the gripping mechanism contacts a second portion of the object; and a controller communicatively connected with the end effector, the controller being configured to generate one or more control signals to control a first arrangement of the one or more grasping elements between the open configuration and the activated configuration and a second arrangement of the gripping mechanism relative to the frame assembly as defined along a longitudinal axis.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale, unless described otherwise. For example, the dimensions of some of the elements can be exaggerated relative to other elements, unless described otherwise. At times, like reference numeral are used across multiple figures. These like reference numerals refer to like parts throughout the multiple figures unless otherwise specified. Embodiments incorporating teachings of the present disclosure are shown and described with respect to the figures presented herein, in which.

DETAILED DESCRIPTION OF THE INVENTION

Figure 1:
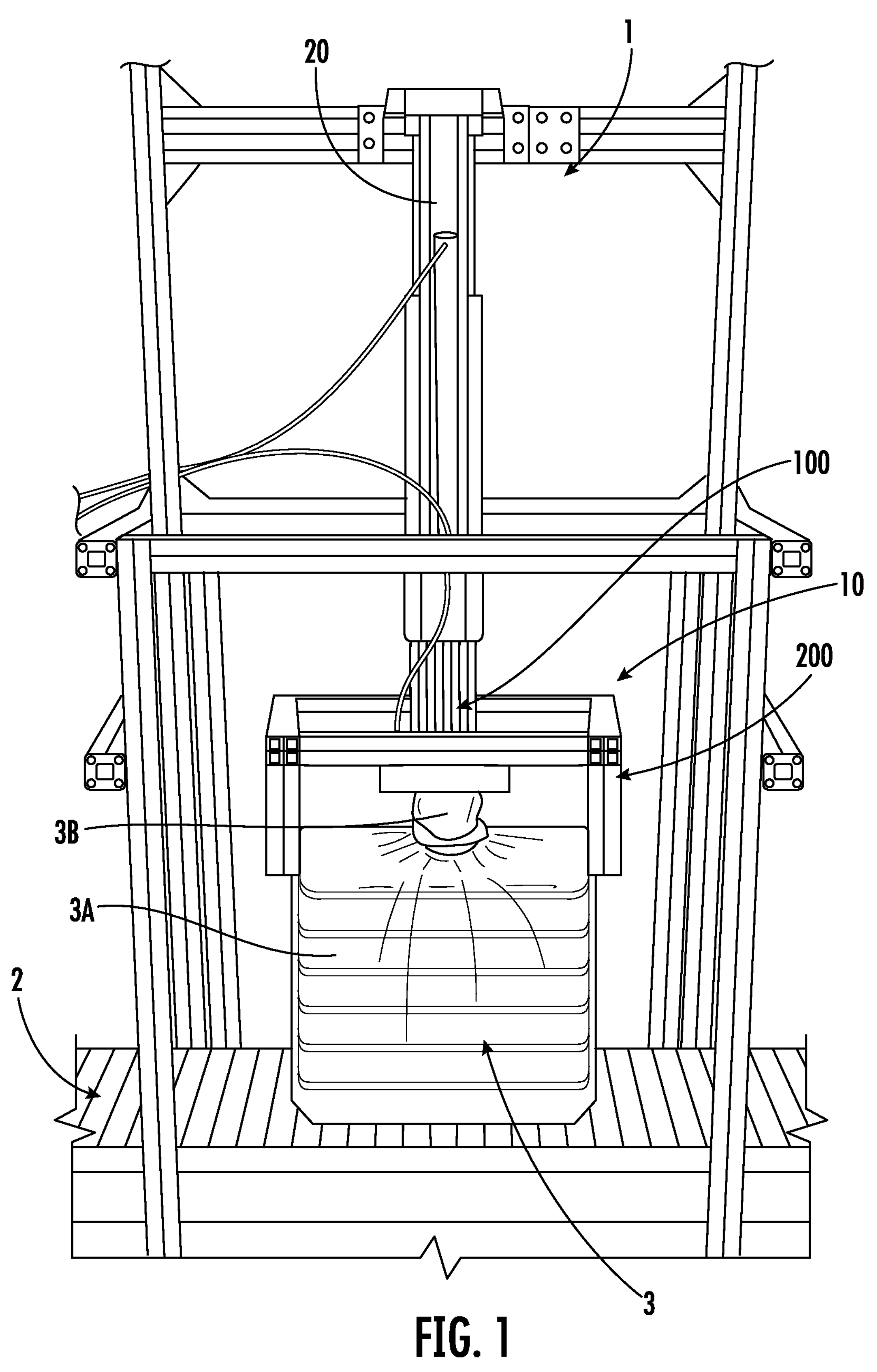
FIG. 1 illustrates an exemplary side perspective view of a robotic system in accordance with various embodiments of the present disclosure.

Some embodiments of the present disclosure will now be described more fully hereinafter with reference to the accompanying drawings, in which some, but not all embodiments of the disclosure are shown. Indeed, these disclosures can be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that can or cannot be present in various embodiments of the present disclosure described herein such that embodiments can include fewer or more components than those shown in the figures while not departing from the scope of the present disclosure. Some components can be omitted from one or more figures or shown in dashed line for visibility of the underlying components.

Aspects of the present disclosure are described below with reference to block diagrams and flowchart illustrations. Thus, it should be understood that each block of the block diagrams and flowchart illustrations may be implemented in the form of a computer program product, a solely hardware aspect, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such aspects can produce specifically configured machines performing the steps or operations specified in the block diagrams and flowchart illustrations. Accordingly, the block diagrams and flowchart illustrations support various combinations of aspects for performing the specified instructions, operations, or steps.

The phrases “in an example embodiment,” “some embodiments,” “various embodiments,” and the like generally mean that the particular feature, structure, or characteristic following the phrase can be included in at least one embodiment of the present disclosure and can be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other embodiments.

If the specification states a component or feature "can," "could," "should," "would," "preferably," "possibly," "typically," "optionally," "for example," "often," or "might" (or other such language) be included or have a characteristic, that a specific component or feature is not required to be included or to have the characteristic. Such components or features can be optionally included in some embodiments or can be excluded.

The term "electronically coupled" or "in electronic communication with" in the present disclosure can refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) can be transmitted to and/or received from the electrical elements and/or electric circuit(s) that are electronically coupled.

Automated robotic systems configured with an end effector can be utilized in a material handling setting to load and/or unload objects from and/or to a handling environment (e.g., conveyor, pallet, etc.). Current end effectors offer several disadvantages in terms of consistency and reliability which results in inefficiencies and inaccuracies for the end effector engaging with at least a portion of an object. For example, end effectors can be designed for loading and/or unloading structured objects (e.g., a plurality of objects arranged in a particular manner within a box and/or bag, no abnormalities to the object, and/or the like). However, end effectors may cause the structured object to become unstructured (e.g., one or more objects become unarranged from a particular manner within a box and/or bag, create abnormalities to the object, and/or the like) while loading and/or unloading the objects from the handling environment. Moreover, the ability to unload objects can degrade depending on the size, dimensions, and arrangement of objects to be handled. In some cases, objects can shift during transit resulting in one or more structured objects to become unstructured. This causes the end effector to be unreliable while loading and/or unloading structured and/or unstructured objects. An end effector that is capable of applying equal amounts of force to structured objects and keep the objects structured and/or cause unstructured objects to become structured is therefore advantageous.

In accordance with various embodiments of the present disclosure, example methods, apparatuses, computer program products and systems are provided that, in some examples provide an end effector for handling objects in a handling environment. The end effector can include a gripping mechanism and a frame assembly configured to handle objects in various structured and/or unstructured arrangements.

For example, the present disclosure provides an end effector including at least one gripping mechanism and at least one frame assembly. The gripping mechanism may further include at least one gripping mechanism base, one or more grasping arms, and at least one longitudinal actuation arm. The one or more grasping arms may be operably coupled to the gripping mechanism base by one or more actuator elements. For example, a first actuator element may be operably coupled to a first grasping arm and a second actuator element may be operably coupled to a second grasping arm, wherein the first and second actuator elements may be configured to linearly translate the first and second grasping arms from a first position to a second position. The longitudinal actuation arm may be operably coupled to the gripping mechanism and/or frame assembly, wherein the longitudinal actuation arm may be configured to translate the gripping mechanism and/or frame assembly from a first position to a second position.

As such, the present disclosure provides an end effector having a frame assembly and a gripping mechanism comprising one or more grasping arms configured to linearly translate. The first and second actuator elements may be configured to translate a first grasping arm and a second grasping arm linearly relative to the base of the gripping mechanism, wherein the grasping arms may be configured to engage with, at least in part, one or more objects. The frame assembly may be configured to engage with, at least in part, one or more objects in a handling environment. In this manner, the end effector can be configured to assist in loading and/or unloading one or more objects from the material handling environments.

In this manner, the end effector described herein provides a practical improvement over conventional end effectors that leads to increasing adjustability, reliability, adaptability and control for loading and/or unloading objects while decreasing inefficiencies and inaccuracies.

FIG. 1 illustrates an exemplary front perspective view of a robotic system 1 in accordance with various embodiments of the present disclosure. The robotic system 1 can include a positioning mechanism 20 (e.g., robotic arm, robotic manipulator, and/or the like) and an end effector 10 operably coupled to the positioning mechanism. The end effector 10 can further comprise a gripping mechanism 100 and a frame assembly 200 coupled to the gripping mechanism. The robotic system 1 can be configured to move one or more objects 3 disposed within a handling environment 2 from one location (e.g., conveyor, pallet, container, etc.) to another location in a controlled manner. In some embodiments, by way of example, the positioning mechanism (e.g., robotic arm, robotic manipulator, and/or the like) can be configured to load and/or unload one or more of the objects 3 within a handling environment 2 by engaging with one or more objects with an end effector 10 having a grasping mechanism 100 with one or more grasping arms to facilitate the engagement, at least in part, of the end effector and the corresponding object 3. As described herein, the one or more grasping arms of the end effector 100 defined by the robotic system 1 can improve the reliability of the end effector and/or the robotic system during execution of one or more operations.

An exemplary positioning mechanism 20 can have a first end and a second end that is opposite to the first end. The positioning mechanism 20 can be mounted to a vertical mount at the first end and the second end can include an end effector 10.

A positioning mechanism 20 can include a robotic arm. The robotic arm can include any robotic arm design such as, for example, a cartesian robotic arm, a cylindrical robotic arm, polar/spherical robotic arm, pneumatic robotic arm, and/or the like. As one example, the position mechanism 20 can include a six degrees of freedom robotic arm. In addition, or alternatively, the positioning mechanism 20 can include a cartesian robotic arm and/or pneumatic robotic arm. In some embodiments, the positioning mechanism 20 can be removably mounted to the vertical mount and can be reconfigured based on one or more load characteristics (e.g., object characteristics, dimensions, arrangements, fragility, etc.) associated with a loading and/or unloading activity.

The end effector 10 can include a frame assembly 200 and a gripping mechanism 100 operable to grasp, draw, drag, and/or otherwise move an object. As one example, the end effector 10 can include one or more grasping mechanism. In addition, or alternatively, the end effector 10 can include mechanical grippers, pneumatic grippers, and/or any other robotic gripping mechanism. In some embodiments, the end effector 10 can be removably coupled to the arm of the positioning mechanism 20 and can be reconfigured based on one or more load characteristics associated with a loading and/or unloading activity.

The robotic system 1 can include one or more vision systems (not shown) configured to capture sensor data indicative of the robotic system's environment. As described herein, the vision systems can include a positioning mechanism vision system. The positioning mechanism vision system can include one or more sensors (e.g., depth, color (e.g., RGB), and other spectrum sensors) for recording sensor data indicative of respective area proximate to the robotic system. By way of example, the sensor data can include environmental data representative of a current (or past) state for each of the handling environment. The handling environment data can be utilized by the robotic system 1 to identify objects within the handling environment and/or automatically actuate a positioning mechanism 20 and/or an end effector 100, as described herein, for handling objects within each of the engagement assembly's respective handling environment.

The robotic system 1 can identify objects for handling (e.g., queued objects) using sensor data indicative of the handling environment of the robotic system 1 such as, for example, a conveyor. For instance, as described herein, the robotic system 1 can include a positioning mechanism vision system. The positioning mechanism vision system can include one or more sensors operable to generate sensor data indicative of the surrounding environment of the robotic system 1. The one or more sensors can include one or more cameras (e.g., RGB cameras), one or more depth sensors (e.g., LiDAR sensors, etc.), and/or any other sensor capable of recording attributes of an environment. The environment can include an area toward the front section of the robotic system. For instance, the robotic system 1 can face the handling environment, such as, for example a pallet. In various embodiments, the sensor data can include environmental data indicative of one or more environment characteristics defined by the handling environment, such as, for example a conveyor. Further, in various embodiments, the sensor data can include object data indicative of one or more objects characteristics defined by one or more of the objects disposed within the handling environment, such as, for example an object position, an object shape, an object size, and/or object distribution within the handling environment.

The robotic system 1 can include a controller communicatively coupled to the positioning mechanism vision system, the positioning mechanism 20, and/or the grasping mechanism 100 defined by the end effector 10. The controller can be configured to automatically control the positioning mechanism 20 and/or the gripping mechanism 100 of the exemplary end effector 10 based on the object data and/or environmental data captured by the positioning mechanism vision system. The controller, for example, can include one or more processors and/or memory devices. The memory devices can include computer-readable instructions for interpreting the object data and/or environmental data and initiating an operation of one or more of the plurality of actuation elements defined by an end effector 10 to cause a resultant movement of one or more grasping arms coupled with the actuation elements based on the object data. The computer-readable instructions, for example, can implement one or more motion planning and/or trajectory generation functions for operating the exemplary end effector 10

With reference to FIG. 1, in various embodiments, an object 3 may be disposed within a handling environment 2, such as, for example, on a conveyor, a pallet, and/or the like, at a position at least substantially proximate to the end effector 10 of the robotic system 1. For example, an exemplary object 3 may embody a plurality of individual items within an external retention component, such as, for example, a bag, a shell, a box, a tote, and/or the like. As an illustrative example, an exemplary end effector 10 may be configured for selectively engage an object 3 comprising a plurality of structured items stacked within the interior of a bag, such as, for example, a plurality of items in a structured stack defined an arrangement of items in one or more column, rows, set, and/or the like. In such an exemplary circumstance, the exemplary end effector 10 may be configured to engage the object 3 such that the stacked plurality of items disposed within the exterior bag remain in a stacked configuration as the end effector 10 transports the object from a first location (e.g., a conveyor) to a secondary location within a handling environment 2.

As described herein, the object 3 may define a first portion 3A corresponding to a body of an exemplary bag (e.g., a portion of the bag surrounding the exterior of the items within the bag) and a second portion 3B embodying a "flower" of the bag defined by an excess of bag material provided along a top portion of the object and/or the bag. In various embodiments, as described herein, the exemplary end effector 10 may be configured such that, upon being positioned at least substantially adjacent at least a portion of the object 3, the frame assembly 200 of the end effector 10 may engage the first portion 3A of the object 3 and the gripping mechanism 100 of the end effector may engage the second portion 3B of the object 3. For example, in various embodiments, the first portion 3A of the object 3 may be defined, at least in part, by an uppermost surface of the one or more items disposed within the interior portion of the bag defined by the object 3. Further, in such an exemplary circumstance, the second portion 3B of the object 3 may be defined, at least in part, by an excess material portion of the bag disposed above (e.g., as defined in the longitudinal direction) the first portion 3A of the object 3.

Figure 2:
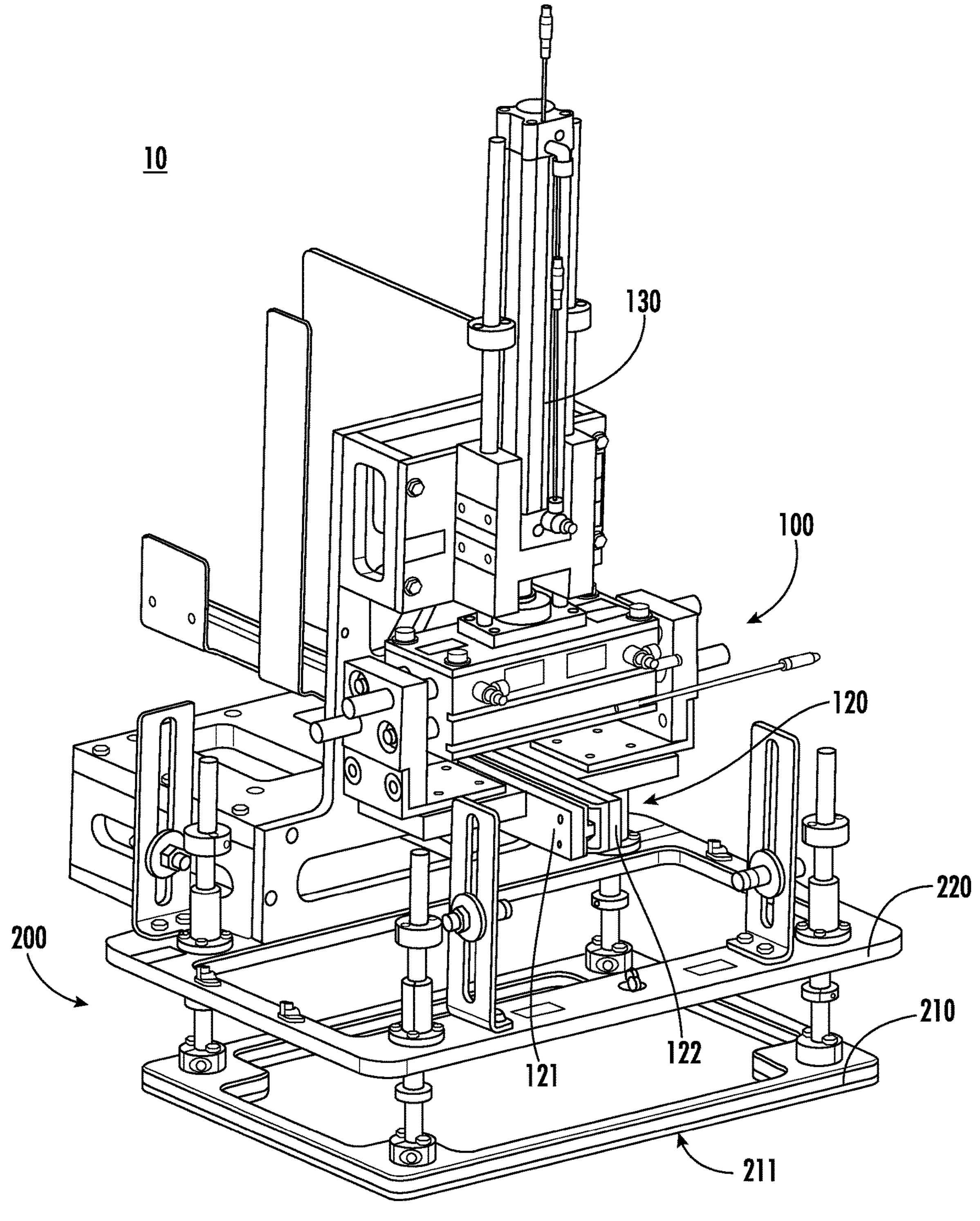
FIG. 2 illustrates an exemplary side perspective view of an end effector in accordance with various embodiments of the present disclosure.

FIG. 2 illustrates an exemplary front perspective view of an end effector 10 in accordance with various embodiments of the present disclosure. The end effector 10 can include a gripping mechanism and a frame assembly. The end effector can be configured to translate from a first position to a second position in a controlled manner by at least one longitudinal actuation arm 130. In some embodiments, by way of example, the end effector can be configured to engage with one or more objects, wherein the frame assembly 200 can engage with a first portion of the object and the gripping mechanism 100 can engage with a second portion of the object.

With further reference to FIG. 2, in various embodiments, the end effector 10 may comprise a gripping mechanism 100 and a frame assembly 200. In one or more embodiments, the gripping mechanism may further comprise a grasping element base 110 (depicted in FIGS. 3A-3B), one or more grasping elements 120, one or more actuator elements 121B (depicted in FIGS. 3A-3B), and a longitudinal actuation arm 130. In various embodiments, the end effector 10 may further comprise a frame assembly 200, wherein the frame assembly may be coupled to the gripping mechanism. In one or more example embodiments, the frame assembly may include a first frame element 210, a first engagement surface 211, and/or a second frame element 220, wherein the first engagement portion 211 may be configured to engage with the first portion of the object. In one or more embodiments, the frame assembly 200 length and width may be configured to be less than the length and width of the one or more objects in the handling environment. In various embodiments, the frame assembly may comprise one or more rigid materials, wherein the one or more rigid materials may be configured to withstand the forces applied by one or more objects, the gripping mechanism 100, and/or the robotic system 1 as a whole. In various embodiments, the first frame element 210 may be configured to be disposed beneath the lowermost edge of the second frame assembly 220. In some embodiments, the first engagement surface 211 may be configured to define the lowermost edge of the first frame element 210.

Figures 3A, 3B:
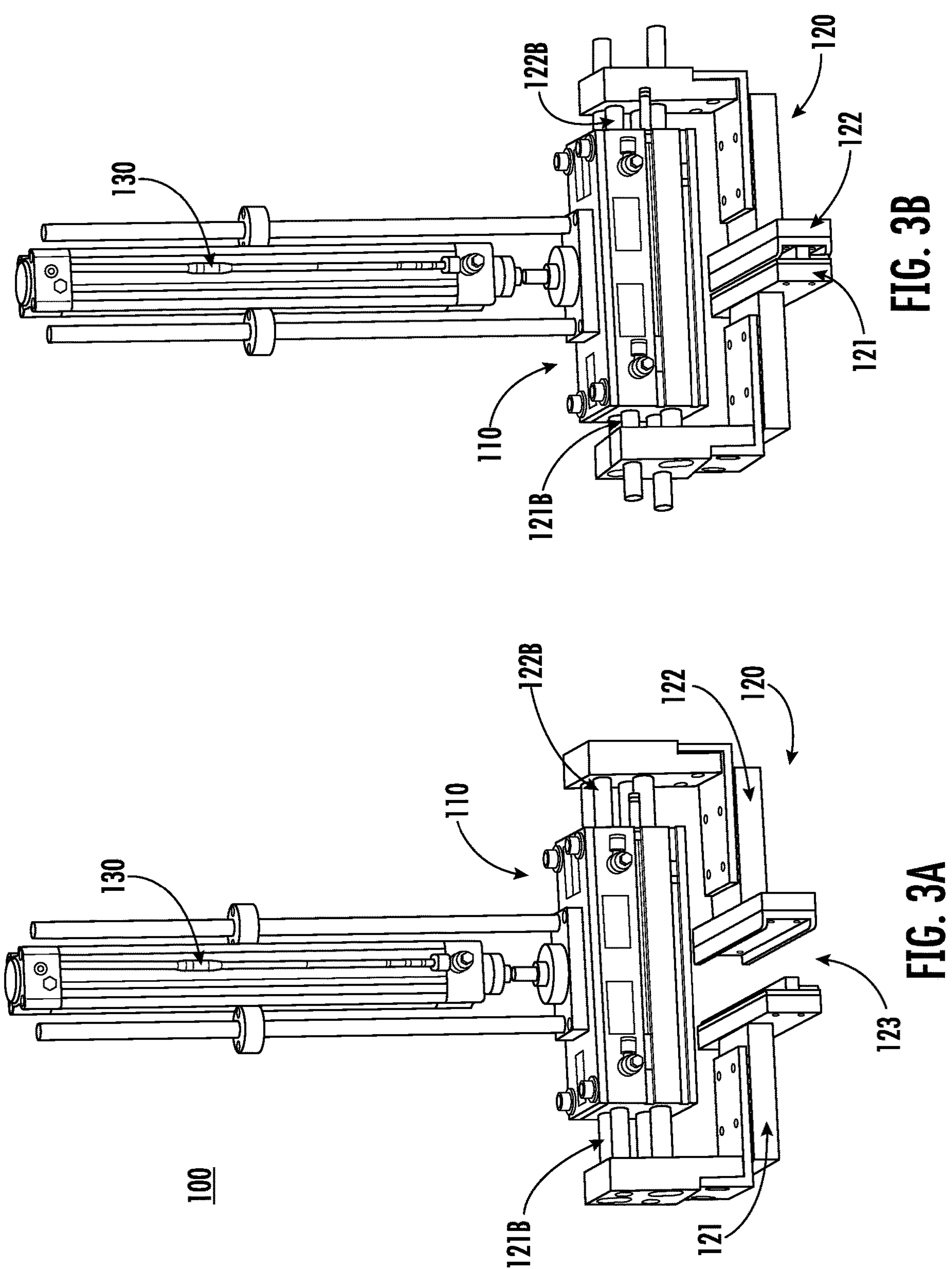
FIG. 3A illustrates an exemplary front perspective view of a gripping mechanism in an inactivated configuration in accordance with various embodiments of the present disclosure.
FIG. 3B illustrates an exemplary front perspective view of a gripping mechanism in an activated configuration in accordance with various embodiments of the present disclosure.

FIGS. 3A-3B illustrate various front perspective views of an exemplary gripping mechanism 100 with one or more grasping elements 120 in accordance with various embodiments of the present disclosure. In various embodiments, as depicted in FIGS. 3A-3B, the gripping mechanism 100 may comprise of a first grasping arm 121 and/or a second grasping arm 122, wherein the first grasping arm 121 and the second grasping arm 122 may be operably connected to the grasping element base 110. For example, in various embodiments, a first actuation element 121B may be configured to operably connect to the first grasping arm 121 and a second actuation element 122B may be configured to operably connect to the second grasping arm 122, wherein the first actuation element 121B and the second actuation element 122B may connect the grasping elements to the base 110. In one or more example embodiments, the first actuation element 121B may be disposed linearly opposite of the second actuation element 122B, wherein the first actuation element 121B may be disposed on a first side of the grasping element base 110 and the second actuation element 122B may be disposed linearly opposite on a second side of the grasping element base 110. In various embodiments, the uppermost surface of the first actuation element 121B and the uppermost surface of the second actuation element 122B may be configured to be disposed on the same plane as the uppermost edge of the grasping element base 110. In various embodiments, the first and second actuation elements 121B and 122B may be configured to translate respective grasping arms 121 and 122 from a first position to a second position. In one or more example embodiments, the first actuation element 121B and the second actuation element 122B may be configured, at least in part, to translate within the grasping element base 110 when translating from the first position to the second position.

With further reference to FIGS. 3A-3B, in one or more example embodiments, the first grasping arm 121 and the second grasping arm 122 may be configured to be disposed beneath the lowermost edge of the grasping element base 110. In various embodiments, the first grasping arm 121 may be disposed linearly opposite of the second grasping arm 122, wherein the first grasping arm 121 engages with the first actuation element 121B on a first side of the base 110, and the second grasping arm 122 engage with the second actuation element 122B on a second linearly opposite side of the base 110. In various embodiments, the first actuation element 121 and the second actuation element 122 may be configured to translate the respective grasping arms from a first position to a second position. In one or more embodiments, as depicted in FIG. 3A, the first position of the one or more grasping elements 120 may be configured to have a lateral gap 123 between the first grasping arm 121 and the second grasping arm. In various embodiments, the first position of the one or more grasping arms may be an inactive position, wherein the lateral gap 123 may be disposed between the first grasping arm 121 and the second grasping arm 122. In one or more embodiments, the lateral gap between the first grasping arm 121 and the second grasping arm 122 may be configured to receive the second portion of the object, wherein the second portion may or may not partially engage the one or more grasping elements 120. In various embodiments, one or more respective actuation elements may be configured to linearly translate, at least in part, one or more grasping elements 120 from the first position to the second position, as depicted in FIG. 3B. In various embodiments, the second position may be, at least in part, an activated position, wherein the lateral gap 123 may not be present. In various embodiment, the second portion of one or more objects may be secured between the first grasping arm 121 and the second grasping arm 122 in the second position such that the gripping mechanism may be able to load and/or unload the one or more objects without slippage.

In various embodiments, as depicted in FIGS. 3A-3B, the gripping mechanism may comprise at least one longitudinal actuation arm 130, wherein the longitudinal actuation arm 130 may be configured to translate, at least in part, the gripping mechanism 100 in a second direction relative to the positioning mechanism. In various embodiments, the longitudinal actuation arm 130 may be configured to translate the gripping mechanism 100 and/or the frame assembly 200, wherein the longitudinal actuation arm 130 may translate the gripping mechanism 100 independently from the frame assembly 130. In one or more embodiments, the longitudinal actuation arm 130 may be configured to translate the gripping mechanism, at least in part, from a first position to a second position relative to the positioning mechanism. In various embodiments, the first position may be configured for the first grasping arm 121 to engage, at least in part, with the second grasping arm 122, wherein the second portion of one or more objects may be securely engaged with the first 121 and/or the second grasping arm 122.

In one or more example embodiments, the longitudinal actuation arm 130 may be configured to translate the gripping mechanism 100, at least partially, in a first direction relative to the positioning mechanism. In various embodiments, the longitudinal actuation arm 130 may be configured to translate the gripping mechanism 100 from a first position to a second position relative to the position mechanism. In various embodiments, the longitudinal actuation arm 130 may be configured to translate the gripping mechanism from an initial position (e.g., the first position) to a second position, wherein the second position may be defined by, at least in part, at least a portion of the second portion of the object is disposed within the lateral gap 123 of the first grasping arm 121 and the second grasping arm 122. In various embodiments, the first actuation element 121B and the second actuation element 122B may be configured to translate the respective grasping arms from an inactive position to an activated position, wherein the respective grasping arms may be configured to secure the second portion of the object. In one or more embodiments, the longitudinal actuation arm 130 may be configured to translate, at least in part, from the second position towards the first position, wherein the translation applies pressure on the object. In one or more embodiments, the longitudinal actuation arm 130 may be configured to stop translating when a pressure threshold has been reached.

Figures 4A, 4B:
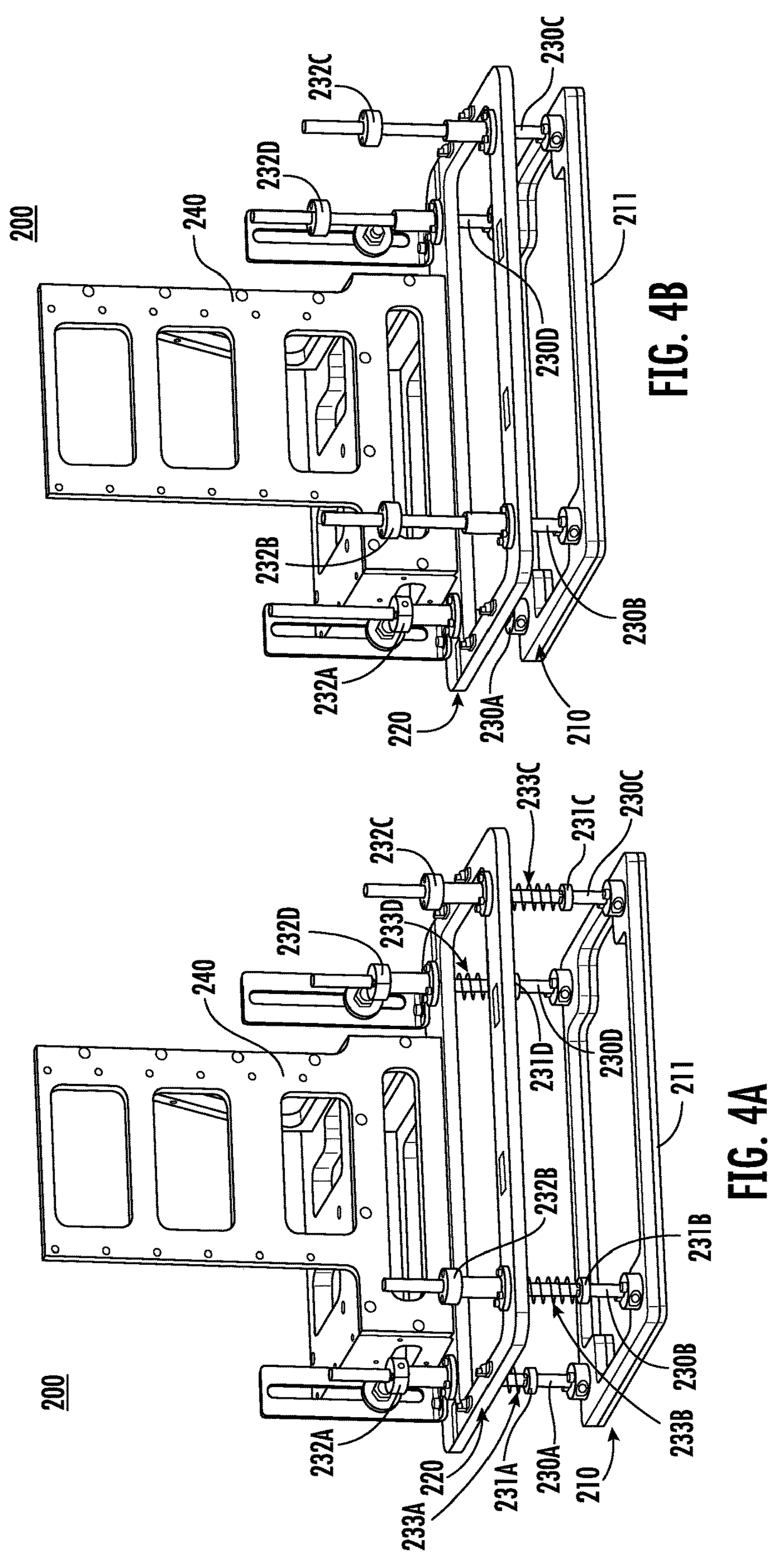
FIG. 4A illustrates an exemplary front perspective view of a frame assembly in a first position in accordance with various embodiments of the present disclosure.
FIG. 4B illustrates an exemplary front perspective view of a frame assembly in a second position in accordance with various embodiments of the present disclosure.

FIGS. 4A-4B illustrate various front perspective views of an exemplary frame assembly 200 in accordance with various embodiments of the present disclosure. In one or more example embodiments, the frame assembly may include a first frame element 210, a first engagement surface 211, and/or a second frame element 220, and a frame assembly base 240, wherein the first engagement portion 211 may be configured to engage with the first portion of the object. In various embodiments, the first frame element 210 of the frame assembly 200 may be configured to contact an exemplary object within a handling environment based at least in part on the arrangement of the end effector (e.g., the positioning mechanism, coupled thereto) relative to the object. In various embodiments, the first frame element 210 is configured for movement relative to the second frame element 200 based at least in part on the physical engagement of the first frame element 210 with the object. For example, in various embodiments, the second frame element 220 may be configured for movement with a positioning mechanism defined by an exemplary robotic system that is operatively coupled to the end effector. The second frame element 220 may define an at least substantially rigid configuration relative to the positioning mechanism of the robotic system such that the first frame element 210 is configured for movement relative to the second frame element 220 along a longitudinal axis based on at least one force acting on the first frame assembly 210 in an at least partially longitudinal direction.

In various embodiments, the first frame element 210 may be configured to connect with the second frame element 220 by one or more guide rods 230A, 230B, 230C, and 230D (collectively "230"). In various embodiments, the plurality of guide rods 230 may each be arranged in an at least substantially longitudinal arrangement such that the one or more guide rods may at least partially guide the movement of the first frame element 210 and define at least apportion of the range of motion of the first frame element 210 relative to the second frame element 220. In various embodiments, the guide rods 230 may further comprise one or more lower track stop 231A, 231B, 231C, and 231D (collectively "231") and/or one or more upper track stop 232A, 232B, 232C, and 232D (collectively "232"). In various embodiments, each of the one or more lower track stops 232 and the one or more upper track stops 231 may be rigidly positioned along a respective guide rod such that each of the one or more lower track stops 232 and the one or more upper track stops 231 are configured to at least partially restrict the range of motion of the first frame element 210 relative to the second frame element 220 in one or more longitudinal directions. Alternatively, or additionally, in one or more embodiments, at least a portion of the one or more lower track stops 232 and the one or more upper track stops 231 may be configured to translate along a respective guide rod 230. In various embodiments, the one or more lower track stop 231 may be configured to act as a physical barrier to prevent the first frame element 210 from translating any closer to the first frame element 210. In one or more embodiments, the one or more upper track stop 232 may be configured to act as a physical barrier to prevent the second frame element 220 from translating off a respective guide rod 230.

In various embodiments, as illustrated in FIG. 4A, the frame assembly 200 of an exemplary end effector 10 may comprise one or more spring elements 233A, 233B, 233C, 233D secured at least in part relative to one or more of the dynamic components of the frame assembly 200, such as, for example, the first frame element 210, such that the relative movement of the dynamic frame component (e.g., the first frame element 210) is at least partially affected (e.g., resisted and/or aided) by one or more spring forces generated by the one or more spring elements 233A, 233B, 233C, 233D. For example, as illustrated, each of the spring elements 233A, 233B, 233C, 233D may define a respective spring length that is arranged along the length of a corresponding guide rod 230A, 230B, 230C, 230D of the frame assembly 200. In such an exemplary configuration, the one or more spring elements, 233A, 233B, 233C, 233D may each be coupled to both the first frame element 210 and the second frame element 220 such that the movement of the first frame element 210 relative to the rigid second frame element 220 (e.g., along the guide rods 230A, 230B, 230C, 230D is resisted and/or assisted by the forces generated by the one or more spring elements 233A, 233B, 233C, 233D.

Figure 5A:
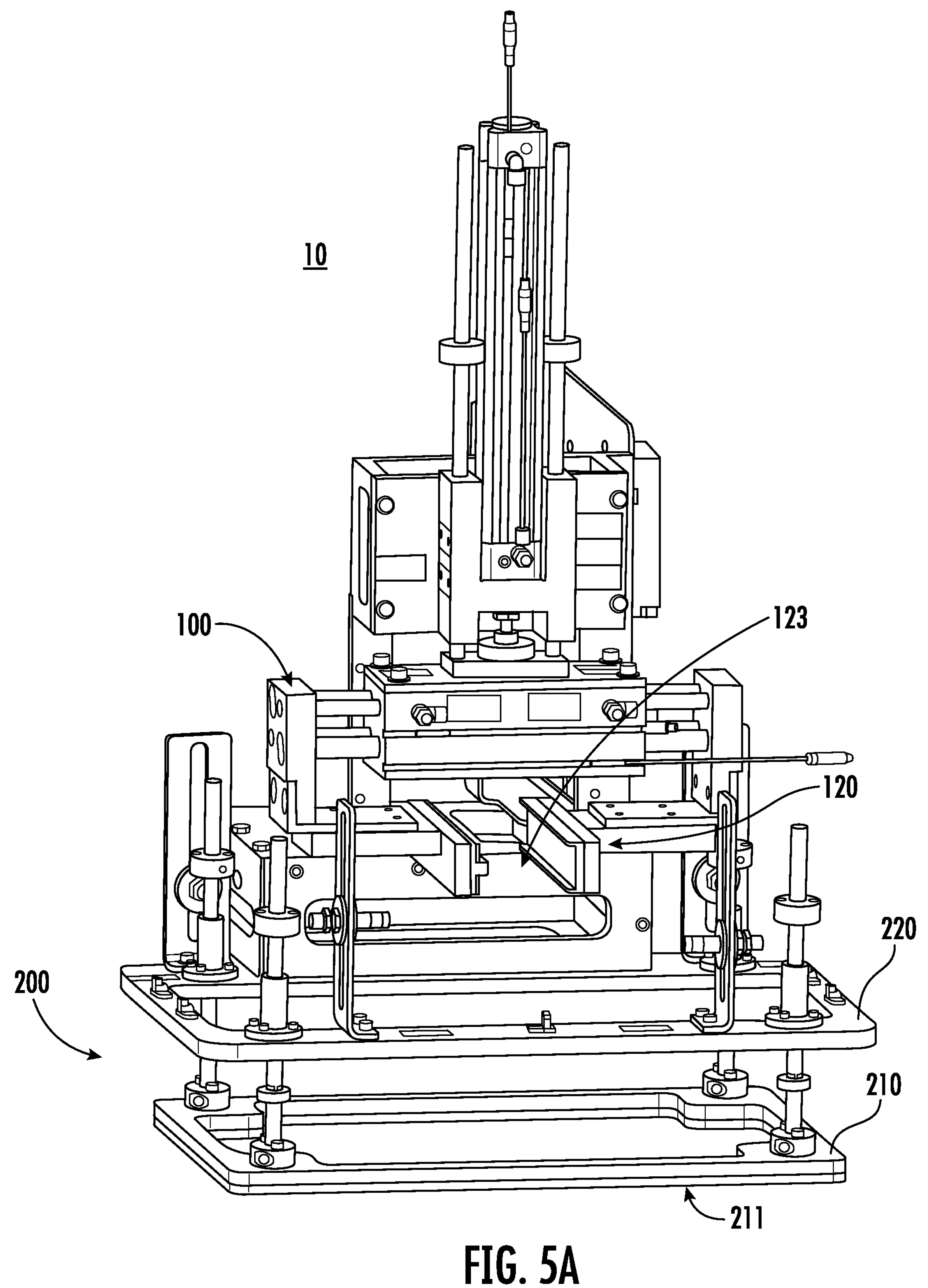
FIGS. 5A-5E illustrate various exemplary front perspective view of an end effector completing an engagement operation in accordance with various embodiments of the present disclosure.

With further reference to FIGS. 4A-4B, in various embodiments, the first frame element 210 may be configured to translate from a first position to a second position, wherein the second position is defined by the first frame element 210 being closer to the second frame element 220 than it was in the first position. For example, the dynamically configured first frame element 210 may be configured to move from the first position to the second position relative to the second frame element 220 such that a vertical separation distance defined between the first and second frame elements 210, 220 decreases (e.g., is at least substantially minimized) as the first frame element 210 moves from the first position towards the second position. As non-limiting examples provided for illustrative purposes, the first frame element 210 of the exemplary frame assembly 200 illustrated in FIG. 4A is shown in a first position, while the first frame element 210 of the exemplary frame assembly 200 illustrated in FIG. 4B is shown in a second position defined by a decreased vertical separation distance between the first and second frame elements 210, 220. For example, as depicted in FIG. 4A, the first frame element 210 of the exemplary frame assembly 200 may be provided in the first position prior to the engagement surface 211 defined by the first frame element 210 physically contacting an object of interest. Further, as illustrated in FIG. 4B, the first frame element 210 of the exemplary frame assembly 200 may be provided in the second position—which may be defined by a minimum vertical separation distance between the first and second frame elements 210, 220—upon the frame assembly 200 being moved further in a downward vertical direction subsequent to the engagement surface 211 contacting an object, so as to cause the object to exert a corresponding pushing force on the engagement surface 211 that causes the first frame element 210 to move towards a second position, as described herein. on the engagement surface 211 contacting the prior to the engagement surface 211 defined by the first frame element 210 physically contacting an object of interest, wherein the first engagement surface 211 may be configured to just have engaged with the first portion of the object. In various embodiments, as depicted in FIG. 4B, may be at the second position, For example, in various embodiments, an exemplary frame assembly 200 may be configured such that the first frame element 210 is provided in the second position upon a threshold amount of pressure being applied to the object. In one or more embodiments, the frame assembly 200 may be configured to translate in the opposite direction of the gripping mechanism when pressure is applied to the object (e.g., the second frame element 220 translate vertically closer to the object while the gripping mechanism 100 moves vertically further from the object). In various embodiments, the frame assembly base 240 may be configured to further define a controller 700 (depicted in FIG. 7), wherein the controller may be configured to control the end effector and/or communicate with the position mechanism vision system. In general, as described with respect to FIGS. 5A-5E, an exemplary end effector 10 may be operable to facilitate a multi-step materials handling operation defined by the relative movements of the dynamic components of the end effector 10 (e.g., the gripping mechanism 120, the first frame element 210, the second frame element 220) that results in the end effector 10 selectively engaging with one or more objects in a material handling environment. For example, controller implemented operations may facilitate the end effector securely engage to one or more objects for loading and/or unloading one or more objects. In particular, FIG. 5A illustrates a perspective view of an exemplary end effector 10 provided in an initial position, wherein the gripping mechanism 100 is provided above (e.g., longitudinally) the frame assembly 200 (e.g., above the second frame element 220 and the first frame element 210, including the engagement surface 211 defined by the first frame element 210). As further illustrated, the initial position of the end effector 10 illustrated in FIG. 5A includes the gripping mechanism 100 being configured in an open configuration. As illustrated, the open configuration of the gripping mechanism 100 may be defined by a first grasping arm and a second grasping arm of the one or more grasping elements 120 being arranged at a lateral distance apart, so as to define a lateral gap 123 therebetween. As described herein in further detail with respect to FIGS. 5B-5E, the first grasping arm 121 and the second grasping arm 122 of the gripping mechanism 100 may be laterally moveable relative to one another such that the lateral gap 123 defined therebetween defines a gap width that is adjustable and configured to be selectively varied (e.g., by one or more control signals received by the end effector 10 from a controller) as the gripping mechanism 100 is selectively configured between the open configuration and the activated configuration.

Figures 5B, 5C:
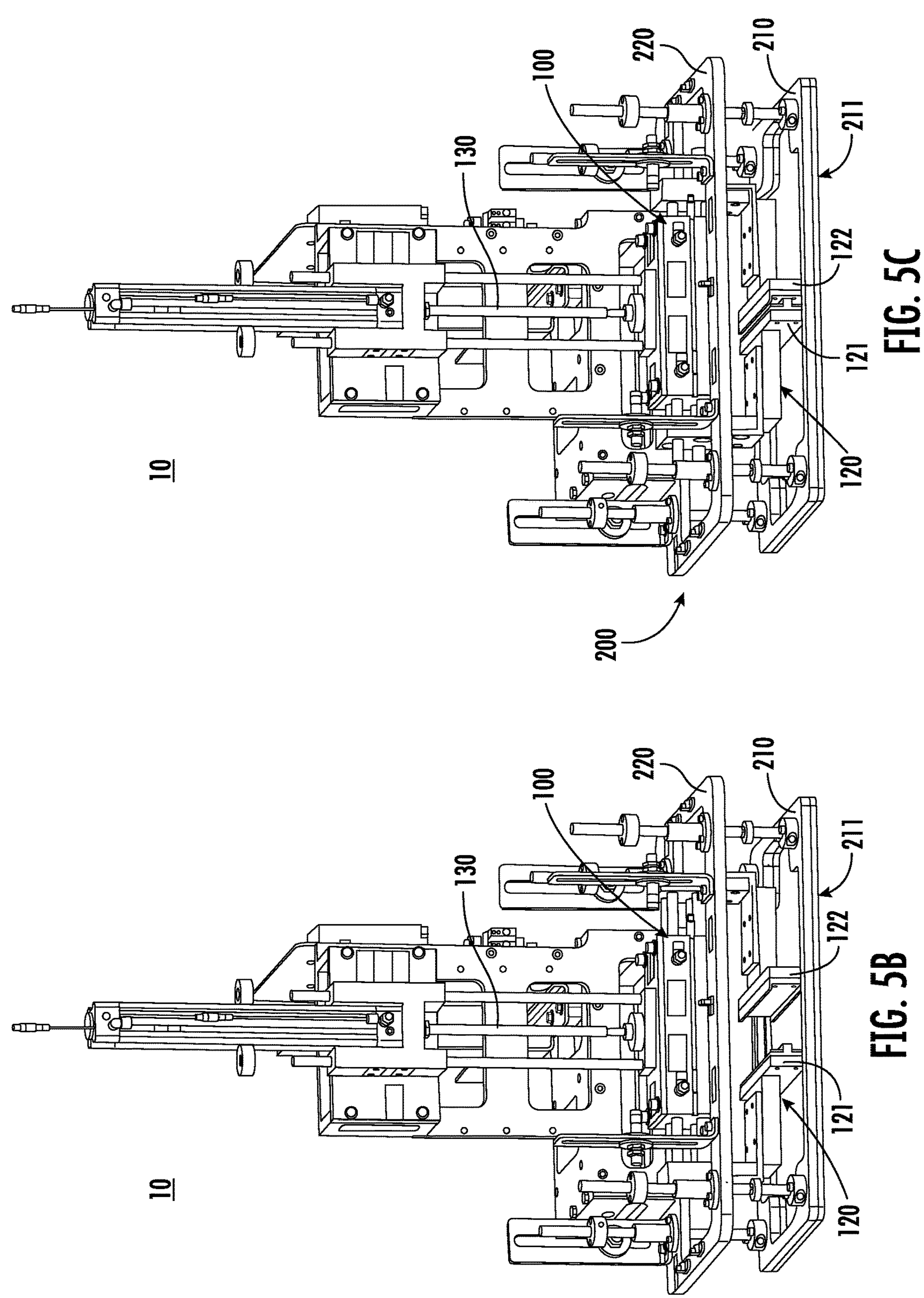

FIG. 5B illustrates another perspective view of the exemplary end effector illustrated in FIG. 5A, wherein the end effector 10 is arranged in a second exemplary arrangement corresponding to a second operation of the exemplary materials handling operation described herein. In the second exemplary arrangement illustrated in FIG. 5B, the end effector 100, including the frame assembly 200 and the gripping mechanism 100, has been moved in a downward longitudinal direction, such as, for example, via a repositioning of the positioning mechanism (e.g., the robotic arm) coupled to the end effector 10, until at least a portion of the engagement surface 211 defined by the frame assembly 200 comes into physical contact with an exemplary object. For example, the end effector 10 may be configured such that, upon the frame assembly 200 (e.g., the first frame element 210) physically contacting the object, the first frame element 210 may move in an upward longitudinal direction (e.g., along the one or more guide rods) relative to the second frame element 220 as a result of one or more forces generated by the contact with the object. In various embodiments, an exemplary robotic system defined in part by a controller may be configured to detect that the end effector 10 has engaged the object based at least in part on one or more signals received by the controller from one or more sensors (not shown) of the end effector 10 configured to capture data corresponding to the relative position of the first frame element 210 relative to the second frame element 220.

In such an exemplary arrangement, wherein the first frame element 210 is engaged with the object, such as, for example, with a first portion of the object defined by an uppermost portion of the plurality of stacked items within the bag defined by the object, the gripping mechanism 100 may be independently operated to continue to move the gripping mechanism 100 in a downward longitudinal direction, such as, for example, via an extension of the longitudinal actuation arm 130, towards the object with which the first frame element 210 is engaged. As described herein, the gripping mechanism 100 may be independently moveable relative to the frame assembly 200 along a longitudinal axis. The end effector 10 may be controlled to position the gripping mechanism 100 relative to the first frame element 210 of the frame assembly 200 such that the one or more grasping element 120 of the gripping mechanism 100 (e.g., the first grasping arm 121, the second grasping arm 122, and the lateral gap defined therebetween) are in a position longitudinally below at least a portion of the frame assembly 200. For example, as illustrated, the gripping mechanism 100 may be moved in a longitudinally downward position to the second exemplary arrangement such that the one or more gripping elements 120 are positioned longitudinally between the first and second frame elements 210, 220 of the frame assembly 200 (e.g., longitudinally below the second frame element 220 and longitudinally above the first frame element 210 including the engagement surface 211 defined by the first frame element 210). For example, the gripping mechanism 100 may be moved into a longitudinal position relative to the first frame element 210 of the frame assembly 200 such that a second portion of the object (e.g., a "flower" defined by a bag of the object) is positioned at least substantially adjacent the one or more gripping elements 120.

In various embodiments, the one or more grasping element 120 are configurable between the open configuration and the activated configuration based on one or more movements of one or both of the first grasping arm 121 and the second grasping arm 122 along a lateral axis that is at least substantially perpendicular to the longitudinal axis along which the gripping mechanism 100 moves relative to the frame assembly 200. For example, as illustrated in the second and third exemplary embodiments illustrated in FIGS. 5B and 5C, respectively, the gripping mechanism 100 may be arranged relative to a frame assembly 200 that is engaged with a first portion of an object such that a second portion of the object is disposed within the lateral gap defined between a first grasping arm 121 and a second grasping arm 122 and the second portion of the object may be secured by the one or more grasping element 120 (e.g., between the first and second grasping arms 121, 122) upon the gripping mechanism being selectively reconfigured from the open configuration (e.g., as illustrated in the second exemplary arrangement of end effector 10 shown in FIG. 5B) to the activated configuration (e.g., as illustrated in the third exemplary arrangement of end effector 10 shown in FIG. 5C). As an illustrative example, FIG. 5C illustrates another perspective view of the exemplary end effector 10 illustrated in FIGS. 5A-5B, wherein the end effector 10 is arranged in a third exemplary arrangement corresponding to a third operation of the exemplary materials handling operation described herein. In various embodiments, an exemplary end effector 10 may be configured such that the activated configuration of the gripping mechanism 100 is defined by one or both of the first grasping arm 121 and the second grasping arm 122 being moved laterally towards the other so as to minimize the adjustable gap width of the lateral gap therebetween in order to secure the second portion of the object between the first grasping arm 121 and the second grasping arm 122. For example, the exemplary third arrangement of the end effector 10 illustrated in FIG. 5C depicts the gripping mechanism 100 in an activated configuration.

Figures 5D, 5E:
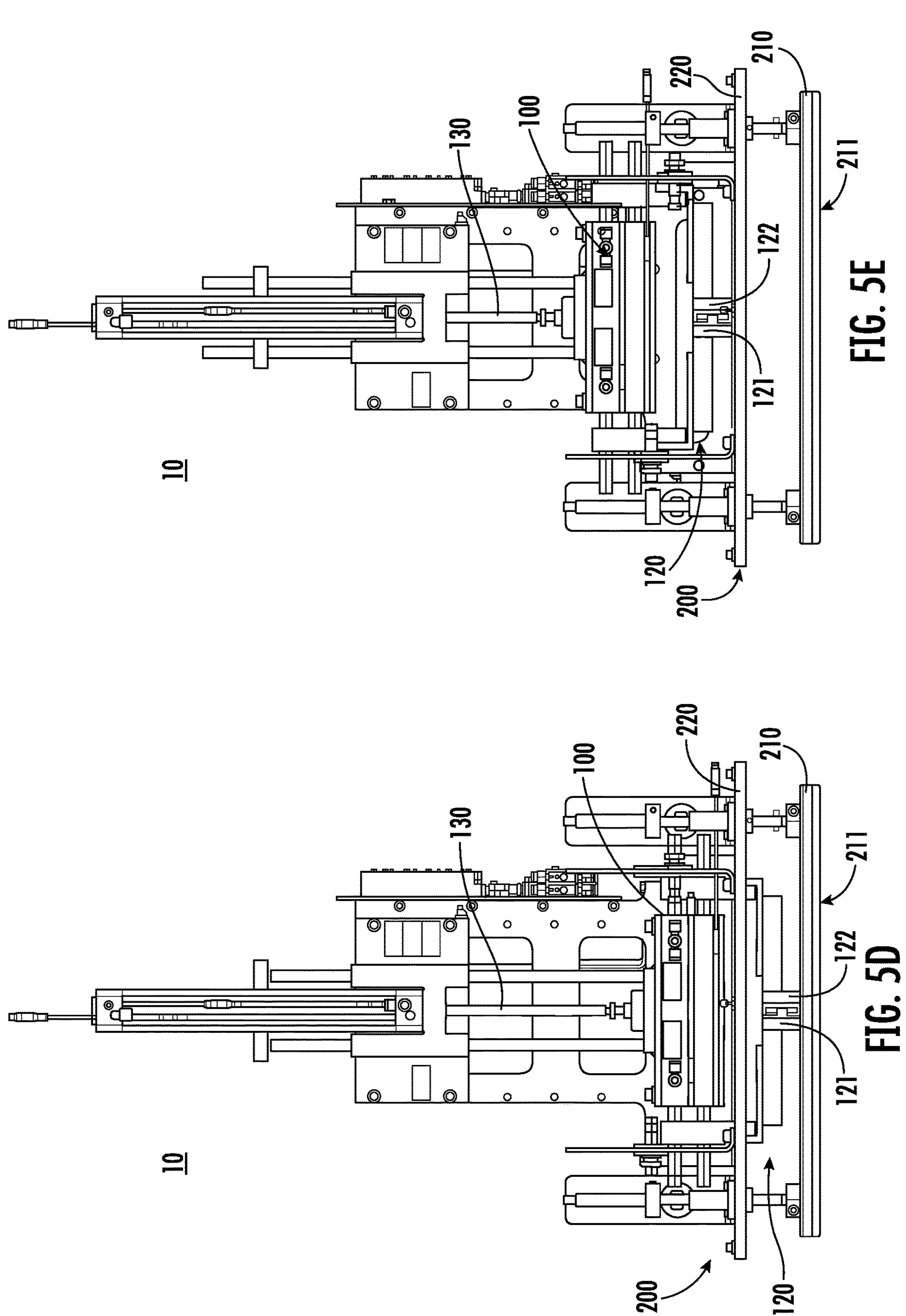

FIG. 5D illustrates another front perspective view of the exemplary end effector illustrated in FIGS. 5A-5C, wherein the end effector 10 is arranged in a fourth exemplary arrangement corresponding to a fourth operation of the exemplary materials handling operation described herein. In the fourth exemplary arrangement illustrated in FIG. 5D, the gripping mechanism 100 in the activated arrangement (e.g., with the second portion of the object secured within the first and second grasping arms 121, 122 of the one or more grasping elements 120) has been moved in an upward longitudinal direction, such as, for example, via a retraction of the longitudinal actuation arm 130 in a direction away from the first portion of the object with which the first frame element 210 of the frame assembly 200 is engaged. For example, the end effector 10 may be configured such that the gripping mechanism 100 moving in an upward longitudinal direction may pull the second portion of the object secured by the one or more grasping element 120 to exhibit a corresponding movement within the gripping mechanism 100. In various embodiments, such a corresponding movement of the second portion of the object (e.g., the flower of the bag defined by the object) may cause one or more pulling forces to be imparted on the first portion of the object in the upward longitudinal direction. Based at least in part on the physical contact of the first portion of the object with the first frame element 210 along at least a portion of the engagement surface 211, the one or more pulling forces imparted on the first portion of the object may be transferred to the first frame element 210. The one or more forces acting on the first frame element 210 as a result of the gripping mechanism pulling the object (e.g., the second portion of the object) in the upward longitudinal direction may cause the first frame element 210 to move in a corresponding upward longitudinal direction relative to the second frame element 220. For example, the end effector 10 may be configured such that, when subjected to such exemplary pulling forces, the first frame element 210 may move in the upward longitudinal direction relative to the second frame element 220 along the one or more guide rods of the frame assembly 200. As illustrated in FIG. 5D, the gripping mechanism 100 engaged with the object (e.g., the second portion of the object) may continue to move in the upward longitudinal direction to the illustrated fourth exemplary arrangement, wherein the first frame assembly 210 is abutted against the one or more upper track stops defined along the length of the guide rods of the frame assembly 200.

For example, in various embodiments, such an exemplary reconfiguration of the end effector 10 defined by a movement of the gripping mechanism 100 in the upward longitudinal direction away from the engagement surface 211 of the frame assembly 200 while the gripping mechanism 100 (e.g., the one or more grasping elements 120) is engaged with the second portion of the object and the first frame assembly 210 is engaged with the first portion of the object may be operable to facilitate a reconfiguration of at least a portion of the object (e.g., a bag defined by the object) from a nominal configuration to a tightened configuration.

FIG. 5E illustrates another front perspective view of the exemplary end effector illustrated in FIGS. 5A-5D, wherein the end effector 10 is arranged in a fifth exemplary arrangement corresponding to a fifth operation of the exemplary materials handling operation described herein. In the fourth exemplary arrangement illustrated in FIG. 5D, the gripping mechanism 100 in the activated arrangement (e.g., with the second portion of the object secured within the first and second grasping arms 121, 122 of the one or more grasping elements 120) has been moved in an upward longitudinal direction, such as, for example, via a retraction of the longitudinal actuation arm 130 in a direction away from the first portion of the object with which the first frame element 210 of the frame assembly 200 is engaged. For example, the end effector 10 may be configured such that the gripping mechanism 100 may continue to be moved in an upward longitudinal direction independently of the first frame element 210 that is secured against the first portion of the object, as described above. Such an upward longitudinal movement of the gripping mechanism 100 while the longitudinal movement of the first frame element 210 is at least partially restricted by the one or more track stops physically abutted thereagainst may result in an increased strain, stress, and/or other internal force being present within the object as the longitudinal distance between the second portion of the object (e.g., secured between the one or more grasping elements 120) and the first portion of the object (e.g., abutted against the engagement surface 211 of the first frame element 210) is increased.

Figure 6:
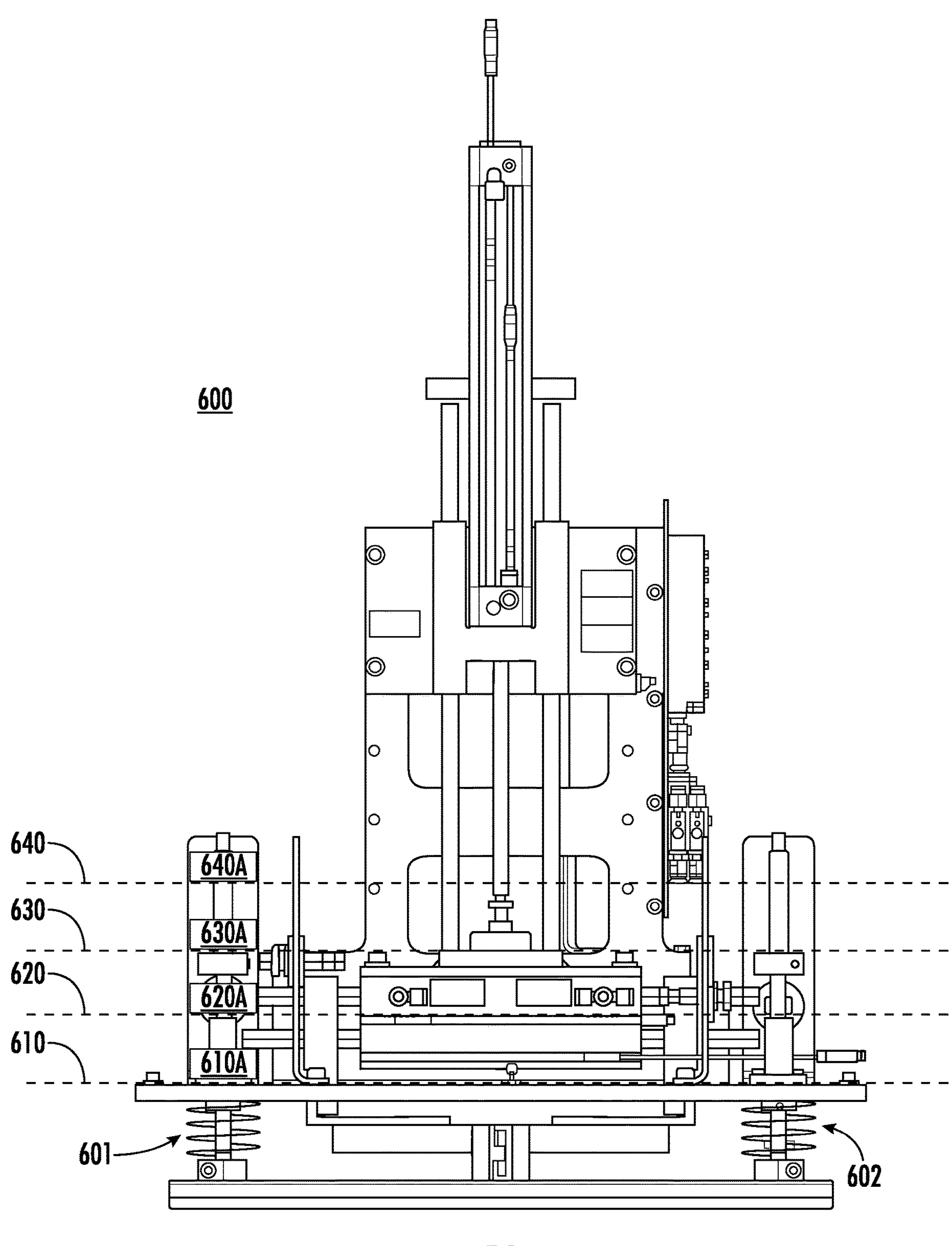
FIG. 6 illustrates an exemplary front perspective view of a plurality of locations of one or more tracks in accordance with various embodiments of the present disclosure.

In various embodiments, as described herein in reference to FIG. 6, one or more sensors of an exemplary end effector 10 may be configured to determine the stress and/or strain on the object (e.g., the tautness of the bag defined by the exemplary object) based at least on data captured by the one or more sensors that corresponds to, is defined by, and/or is otherwise affected by the relative position of the one or more grasping elements 120 (e.g., the interface defined by the minimized lateral gap between the first and second grasping arms 121, 122 in the activated configuration) relative to the engagement surface of the first frame element 210. For example, as described herein in reference to FIGS. 4A and 6, an exemplary frame assembly 200 may define one or more spring elements (e.g., elements 233A, 233B, 233C, 233D in the exemplary end effector 10 of FIG. 4A, and elements 601 and 602 in the exemplary end effector 600 of FIG. 6) configured to provide the resistance necessary for the strain and/or stress in an object (e.g., a bag) to be determined using one or more position sensors of the end effector 10.

For example, the exemplary fifth arrangement of the end effector 10 shown in FIG. 5E represents the arrangement in which the end effector is selectively configured (e.g., by a controller communicatively connected therewith) in order to transport an object engaged therewith from a first location within a handling environment to a secondary location within the handling environment while ensuring both (i) the positional integrity of the items within the external bag defined by the object, and (ii) the structural integrity of the stack defined by the arrangement of the plurality of items within the external bag. By engaging the bag at both a second and first portion (e.g., via a gripping mechanism 100 and a frame assembly 200, respectively) and selectively moving one or more components of the end effector 10 relative to one another to secure the object in an arrangement defined by a predetermined amount of sensor strain (e.g., corresponding to a predetermined force threshold defined either directly or indirectly by the position data captured by the one or more of the sensors of the end effector 10), the exemplary end effector 10 may be configured to facilitate execution of a more bespoke materials handling operation that accommodates the specific structural characteristics of an object defined by a plurality of stacked items disposed within an external bag.

In various embodiments, an exemplary end effector may further comprise one or more sensors configured to measure data corresponding at least in part to a position of the frame assembly relative to one or more of the object and the gripping mechanism. For example, FIG. 6 illustrates an exemplary end effector 600 comprising one or more sensors according to various embodiments described herein.

For example, as described herein at least a portion of the one or more sensors of the end effector 600 may be configured to capture data corresponding to a position of at least a portion of the frame assembly and/or detect that the frame assembly of the end effector 600 (e.g., the engagement surface of the first frame element) has physically engaged with an object. As a non-limiting example, in various embodiments, an exemplary controller may be configured to receive data captured by the one or more sensors and transmitted thereto to determine that the first frame element of the frame assembly of the end effector 600 has physically engaged the object (e.g., a first portion of the object) based at least in part on captured data corresponding to a measured strain and/or stress present within at least a portion of the first frame element and/or a movement of the first frame element in a longitudinal direction (e.g., along the one or more guide rod) relative to a second frame element of the frame assembly in a direction at least substantially towards the second frame element. As a further non-limiting example, in various embodiments wherein at least a portion of the one or more sensors embodies a position sensor configured to capture position data defining the positional arrangement (e.g., relative arrangement) of one or more components of the frame assembly, the exemplary controller may be configured to receive the data captured by the one or more sensors and transmitted thereto in order to determine the strain and/or stress present within at least a portion of the object engaged with the frame assembly (e.g., the bag portion) based on the captured position data.

Further, in various embodiments, the one or more sensors of an exemplary end effector 10 may be configured to measure data corresponding at least in part to a position of the frame assembly 200 relative to one or more of the object and the gripping mechanism 100. In various embodiments, at least a portion of the one or more sensors defined by the end effector 10 may be configured to determine and/or capture data corresponding to a relative position of the gripping mechanism 100 with respect to at least a portion of the frame assembly (e.g., the first frame element 210, the second frame element 220, one or more of the track stops, and/or the like), wherein the relative position is defined along a longitudinal axis. In various embodiments, one or more of the sensor utilized by the end effector 200 may be secured relative to the frame assembly 200 and may be configured to determine a relative position of the gripping mechanism 100 with respect to the at least a portion of the frame assembly 200 based on one or more detected forces corresponding to an arrangement of the first frame element 210 of the frame assembly 200 relative to the second frame element 220.

As a non-limiting example provided for illustrative purposes, the exemplary end effector 600 illustrated in FIG. 6 comprises a plurality of sensors including a first sensor 610, a second sensor 620, a third sensor 630, and a fourth sensor 640. The plurality of sensos 610A, 620A, 630A, 640A may be configured to collectively capture data that facilitates a characterization of one or more of an arrangement of the frame assembly relative to an exemplary object, an arrangement of a first frame element of the frame assembly relative to a second frame element of the frame assembly, and an arrangement of the first frame element of the frame assembly relative to at least a portion of the gripping mechanism (e.g., the one or more grasping element). As a non-limiting example, in various embodiments, one or more sensors 610, 620, 630, 640 defined by the exemplary end effector 600 may comprise position sensors configured to measure and/or capture position data defined by the relative position of the first and second frame elements of the frame assembly based at least in part on the configuration of one or more spring elements (e.g., a first spring element 601 and a second spring element 602) defined by the frame assembly. For example, in various embodiments, the frame assembly 200 may comprise one or more spring elements 601, 062 operatively coupled to both the first frame element and the second frame element of the frame assembly and configured such that a variable spring force defined by each of the one or more spring elements 601, 602 may vary based on a relative position of the second frame element with respect to one or more of the first frame assembly and the gripping mechanism, as defined along a longitudinal axis. For example, in various embodiments, the exemplary end effector 600 may comprise one or more sensors 610A, 620A, 630A, 640A configured to capture data corresponding to the relative position of the first frame element with respect to the second frame element, said relative position being affected and/or corresponding at least in part to a resistive spring force (e.g., a compression spring force and/or a retraction spring force) generated by each of the one or more spring elements 601, 602. In various embodiments, the one or more sensors 610, 620, 630, 640 may be calibrated according to the configuration of the one or more springs 601, 602 such that the position data captured by the one or more sensors 610A, 620A, 630A, 640A may facilitate an accurate determination the stress and/or strain within an object engaged with the frame assembly that accounts for the resistance provided by the spring forces of the one or more spring elements 601, 602. For example, one or more position sensors 610A, 620A, 630A, 640A may be configured to facilitate a determination of the relative position of one or more dynamically configurable components of the end effector 600 (e.g., the relative position of the dynamic first frame element relative to the rigid second frame element) based at least in part on one or more forces generated by the spring elements 601, 602 of the frame assembly to facilitate a determination that one or more internal strength characteristics (e.g., stress, strain, and/or the like) defined by the object engaged with the end effector 600 has reached a predetermined threshold value.

For example, in various embodiments, the plurality of sensors 610A, 620A, 630A, 640A may each comprise gate sensors configured to capture data corresponding to the position of the first frame element (e.g., the dynamic frame element of the frame assembly configured to move relative to the rigid second frame element based on the first frame element being moveable along the guide rods of the frame assembly and configured for physical contact with an object). For example, based at least in part on first position data (e.g., a first signal) captured and/or generated by the first sensor 610A, second position data (e.g., a second signal) captured and/or generated by the second sensor 620A, third position data (e.g., a third signal) captured and/or generated by the third sensor 630A, and fourth position data (e.g., a fourth signal) captured and/or generated by the fourth sensor 640A, the plurality of sensors 610A, 620A, 630A, 640A may be configured to facilitate a determination that the first frame element engaged with an exemplary object is positioned at a first longitudinal position 610, a second longitudinal position 620, a third longitudinal position 630, and fourth longitudinal position 640, respectively, along the one or more guide rods. In various embodiments, an exemplary controller may be configured to receive the position data captured by the plurality of sensors 610A, 620A 630A, and 640A and process said data in order to determine, based at least in part on the position of the first frame element, as defined by the sensor-captured data, one or more internal force conditions present within an object (e.g., a bag defined by the object) at a particular instance given the arrangement of the end effector.

As described herein, in some embodiments, the one or more sensors may be configured to sense position data defined by an indication that one or more components of the frame assembly is present and/or moving through a corresponding predetermined location. For example, in various embodiments, the controller may be configured to utilize the indication (e.g., captured via the one or more sensors) that a component of the frame assembly is present at a predetermined location component to determine, based further on one or more known characteristics of the one or more spring elements), the relative position of one or more components of the end effector 600 without the use of various imaging devices to optically detect component positions.

In various embodiments, the one or more sensors may be configured to directly and/or indirectly facilitate a measurement of the force applied by an engagement surface of the first frame element to the first portion of the one or more objects. For example, in various embodiments, the first engagement surface may be configured to engage with the first portion of the object applying an initial pressure. As the one or more gripping element of the gripping mechanism engages a second portion of the object and, further, translates in an upward longitudinal direction away from the engagement surface of the first frame element, the physical contact between the first portion of the object and the first frame element results in additional forces (e.g., pressure, strain, stress, and/or the like) being realized by the object. In various embodiments, the one or more sensors may be configured to translate along a respective guide rod, wherein the one or more sensors may translate from the initial position 610 to a second 620 and/or a third position 630 along the respective guide rods. In various embodiments, a fourth position 640 may define a threshold strain position, wherein, upon determining that the position of the engagement surface of the first frame element has been reached, the controller of the exemplary robotics system may be configured to transmit one or more control signals to the end effector 600 stop the gripping mechanism from translating further in the longitudinal direction relative to the first frame element of the frame assembly.

Figure 7:
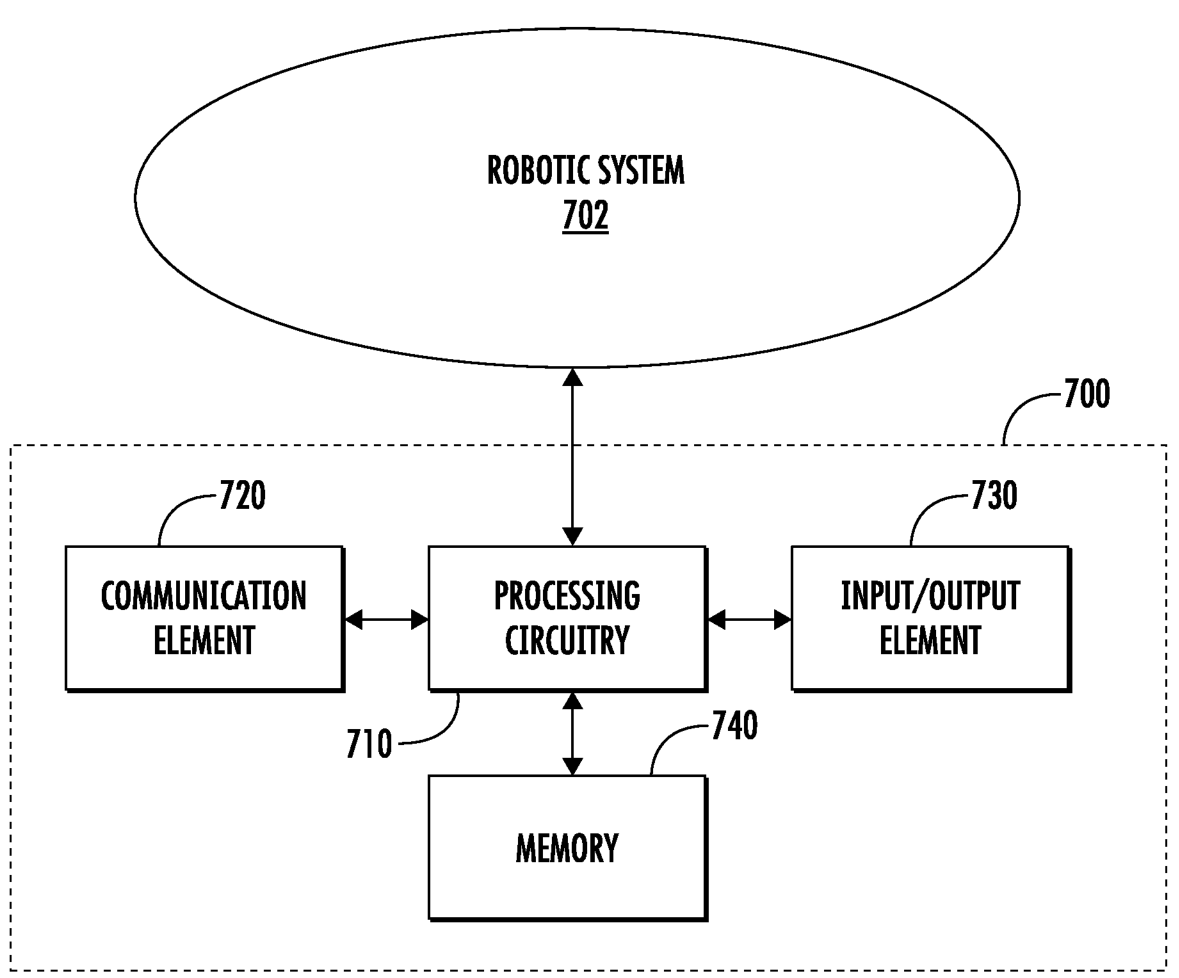
FIG. 7 illustrates an example controller component in electronic communication with various other components of an example robotic system in accordance with various embodiments of the present disclosure.

FIG. 7 illustrates an example controller component 700 in electronic communication with various other components of an example robotic system 702 in accordance with various embodiments of the present disclosure. As shown, the controller component 700 comprises processing circuitry 710, a communication element 720, input/output element 730, a memory 740 and/or other components configured to perform various operations, procedures, functions or the like described herein.

In some embodiments, the controller component 700 can be or comprise a printed circuited board (PCB). In some examples, the controller component 700 (e.g., PCB) can further comprise one or more of a full bridge motor driver, a hall sensor, one or more thermal sensors, one or more user interfaces, one or more protection circuits, configuration management circuitry, a wireless interface, sensing element circuitry (e.g., image sensor circuitry), an interface connector, power control circuitry, gate driver circuitry and/or the like.

The processing circuitry 710 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 7 as a single processor, in an embodiment, the processing circuitry 710 can include a plurality of processors and signal processing modules. The plurality of processors can be embodied on a single electronic device or can be distributed across a plurality of electronic devices collectively configured to function as the circuitry of the robotic system 702. The plurality of processors can be in operative communication with each other and can be collectively configured to perform one or more functionalities of the circuitry of the robotic system as described herein. In an example embodiment, the processing circuitry 710 can be configured to execute instructions stored in the memory 740 or otherwise accessible to the processing circuitry 701. These instructions, when executed by the processing circuitry 710, can cause the circuitry of the robotic system 702 to perform one or more of the functionalities, as described herein.

In various embodiments, the controller 700 may be configured to communicate with a robotic system 702 via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol.

In one or more embodiments, the controller 700 may be configured to communicate via one or more communication elements 720, wherein the controller 700 may be configured to transmit operation instructions to one or more components of the end effector and/or robotic systems. For example, in various embodiments, the controller may be configured to transmit one or more instruction signals to the end effector, wherein the instructional signals may be configured to actuate the end effector to engage with the object in the handling environment. In various embodiments, the controller may be configured to transmit one or more additional signals to the end effector and/or robotic system, wherein the one or more additional signals may be configured for the end effector to complete various operation previously described. In various embodiments, the controller 700 may be configured to communicate with the robotic system 702, wherein the controller may be configured to communicate with one or more vision systems of the robotic system 702 configured to detect objects within the handling environment.

Whether configured by hardware, firmware/software methods, or by a combination thereof, the processing circuitry 710 can include an entity capable of performing operations according to embodiments of the present disclosure while configured accordingly. Thus, for example, when the processing circuitry 710 is embodied as an ASIC, FPGA or the like, the processing circuitry 710 can include specifically configured hardware for conducting one or more operations described herein. Additionally, or alternatively, when the processing circuitry 710 is embodied as an executor of instructions, such as can be stored in the memory 740, the instructions can specifically configure the processing circuitry 710 to perform one or more algorithms and operations described herein.

Thus, the processing circuitry 710 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 740 can include suitable logic, circuitry, and/or interfaces that are adapted to store a set of instructions that is executable by the processing circuitry 710 to perform predetermined operations. Additionally, or alternately, the memory 740 can be configured to store data/information, application programs, instructions, etc., so that the controller component 700 can execute various functions according to the embodiments of the present disclosure. For example, in at least some embodiments, the memory 740 is configured to cache input data for processing by the processing circuitry 710. Thus, in at least some embodiments, the memory 740 is configured to store program instructions for execution by the processing circuitry 710. The memory 740 can store information in the form of static and/or dynamic information. When the functions are executed, the stored information can be stored and/or used by the controller component 700. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 740 can be integrated with the processing circuitry 710 on a single chip, without departing from the scope of the disclosure.

The communication element 720 can be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 740) and executed by a processing component 700 (for example, the processing circuitry 710). In some embodiments, the communication element 720 (as with other components discussed herein) can be at least partially implemented as the processing circuitry 710 or otherwise controlled by the processing circuitry 710. In this regard, the communication element 703 can communicate with the processing circuitry 710, for example, through a bus. The communication element 703 can comprise, for example, antennas, transmitters, receivers, transceivers, network interface cards and/or supporting hardware and/or firmware/software and is used for establishing communication with another apparatus. The communication element 720 can be configured to receive and/or transmit any data that can be stored by the memory 740 by using any protocol that can be used for communication between apparatuses. The communication element 720 can additionally or alternatively communicate with the memory 740, the input/output element 730 and/or any other component of the processing component 700, for example, through a bus.

In some embodiments, the processing component 700 can comprise an input/output element 730. The input/output element 730 can communicate with the processing circuitry 710 to receive instructions input by the user and/or to provide audible, visual, mechanical, or other outputs to the user. Therefore, the input/output element 730 can comprise supporting devices, such as a keyboard, a mouse, a display, a touch screen display, and/or other input/output mechanisms. Alternatively, at least some aspects of the input/output element 730 can be implemented on a device used by the user to communicate with the processing component 700. The input/output element 730 can communicate with the memory 740, the communication element 720 and/or any other component, for example, through a bus. One or a plurality of input/output modules and/or other components can be included in the processing component 700.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. An end effector configured to selectively engage an object, the end effector comprising:

a frame assembly; and a gripping mechanism configured to grasp the object using one or more grasping element, the one or more grasping element being configurable between an open configuration and an activated configuration;

wherein the gripping mechanism is independently moveable relative to the frame assembly in one or more directions;

wherein the end effector is configured to engage the object such that the frame assembly contacts a first portion of the object, and the gripping mechanism contacts a second portion of the object; and wherein the frame assembly comprises:

a first frame element configured for movement with a positioning mechanism operatively coupled to the end effector; and a second frame element being operatively coupled to the first frame element and configured for movement relative to the first frame element based at least in part on a contact of the second frame element with the first portion of the object.

2. The end effector of claim 1, wherein the second frame element is configured to contact the first portion of the object.

3. The end effector of claim 2, wherein the first frame element defines an at least substantially rigid configuration relative to the positioning mechanism, and wherein the second frame element is configured for movement relative to the first frame element along a longitudinal axis based on at least one force acting on the second frame element in an at least partially longitudinal direction.

4. The end effector of claim 1, wherein the one or more grasping element comprise a first grasping arm and a second grasping arm, the first grasping arm and the second grasping arm being configured to define a lateral gap therebetween.

5. The end effector of claim 4, wherein the first grasping arm and the second grasping arm are laterally moveable relative to one another such that the lateral gap is defined by a gap width that is adjustable, the adjustable gap width being configured to vary as the gripping mechanism is selectively configured between the open configuration and the activated configuration.

6. The end effector of claim 5, wherein the activated configuration of the gripping mechanism is defined by one or more of the first grasping arm and the second grasping arm being moved so as to minimize the adjustable gap width of the lateral gap therebetween in order to secure the second portion of the object between the first grasping arm and the second grasping arm.

7. The end effector of claim 1, wherein the gripping mechanism is independently moveable relative to the frame assembly along a longitudinal axis.

8. The end effector of claim 7, wherein the one or more grasping element is configurable between the open configuration and the activated configuration based on one or more movements along a lateral axis.

9. The end effector of claim 8, wherein the longitudinal axis is at least substantially perpendicular to the lateral axis.

10. The end effector of claim 1, wherein the end effector is configured for selectively reconfiguring at least a portion of the object engaged therewith between a nominal configuration and a tightened configuration.

11. The end effector of claim 10, wherein the end effector is configured for selectively reconfiguring the at least a portion of the object engaged therewith between the nominal configuration and the tightened configuration based on an independent movement of the gripping mechanism relative to the frame assembly that causes a longitudinal distance defined between the first portion of the object engaged with the frame assembly and the second portion of the object engaged with the gripping mechanism to increase.

12. The end effector of claim 10, wherein the end effector is configured to selectively reconfigure the at least a portion of the object to the tightened configuration upon the one or more grasping element being provided in the activated configuration.

13. The end effector of claim 12, wherein the end effector is configured to selectively reconfigure the at least a portion of the object to the tightened configuration further upon the frame assembly being engaged with the first portion of the object.

14. The end effector of claim 1, wherein the end effector is configured to selectively move the frame assembly and the gripping mechanism at least substantially simultaneously along a longitudinal axis to facilitate one or more of an engagement with at least a portion of the object and a repositioning of the object from first longitudinal position to a second longitudinal position; and wherein the end effector is further configured to selectively move the gripping mechanism independently along the longitudinal axis relative to the frame assembly to facilitate a reconfiguration of the object from a nominal configuration to a tightened configuration.

15. The end effector of claim 1, further comprising one or more sensors configured to measure data corresponding at least in part to a position of the frame assembly relative to one or more of the object and the gripping mechanism.

16. The end effector of claim 15, wherein at least a portion of the one or more sensors is configured to detect an engagement of the frame assembly with the object.

17. The end effector of claim 15, wherein at least a portion of the one or more sensors is configured to determine a relative position of the gripping mechanism with respect to at least a portion of the frame assembly, the relative position being defined along a longitudinal axis.

18. The end effector of claim 17, wherein at least a portion of the one or more sensors is configured to determine a relative position of the gripping mechanism with respect to the at least a portion of the frame assembly based on one or more detected forces corresponding to an arrangement of a first frame element of the frame assembly relative to a second frame element of the frame assembly, wherein the frame assembly is configured for contacting the first portion of the object at the second frame element.

19. The end effector of claim 15, wherein at least a portion of the one or more sensors is configured to sense position data defined by one or more of a first frame element of the frame assembly and a second frame element of the frame assembly, wherein the frame assembly is configured for contacting the first portion of the object at the second frame element, wherein the frame assembly comprises one or more spring elements operatively coupled to both the first frame element and the second frame element such that a reposition of the first frame element relative to the second frame element is at least partially affected by a spring force defined by the one or more spring elements, and wherein the end effector is configured such that the spring force varies based on a relative position of the second frame element with respect to one or more of the first frame element and the gripping mechanism as defined along a longitudinal axis.

20. A system for handling an object within a handling environment, the system comprising:

an end effector configured to selectively engage the object, the end effector comprising:

a frame assembly; and a gripping mechanism configured to grasp the object using one or more grasping element, the one or more grasping element being configurable between an open configuration and an activated configuration;

wherein the gripping mechanism is independently moveable relative to the frame assembly in one or more directions;

wherein the end effector is configured to engage the object such that the frame assembly contacts a first portion of the object, and the gripping mechanism contacts a second portion of the object; and wherein the frame assembly comprises:

a first frame element configured for movement with a positioning mechanism operatively coupled to the end effector; and a second frame element being operatively coupled to the first frame element and configured for movement relative to the first frame element based at least in part on a contact of the second frame element with the first portion of the object; and a controller communicatively connected with the end effector, the controller being configured to generate one or more control signals to control a first arrangement of the one or more grasping element between the open configuration and the activated configuration and a second arrangement of the gripping mechanism relative to the frame assembly as defined along a longitudinal axis.

* * * * *